Patented Mar. 18, 1952

2,590,039

UNITED STATES PATENT OFFICE 2,590,039

REACTION OF ORGANOSILICONHALIDES WITH ORGANODITHIOLS AND DISELENYL SUBSTITUTED ORGANO COMPOUNDS, AND PRODUCTS THEREOF

Frederick P. Richter, Woodbury, N. J., and Bernard A. Orkin, Philadelphia, Pa., assignors to Socony-Vacuum Oil Company, Incorporated, a corporation of New York No Drawing. Application July 30, 1948,
Serial No. 41,716

16 Claims. (Cl. 260—448.8)

This invention relates to new compositions of matter and to a method for their preparation.

The new compositions of the invention may be broadly designated as organic silicon-containing products, which also contain at least one constituent selected from the group consisting of sulfur, oxygen and selenium. More specifically, there reaction products are comprised of two general types of compounds, viz. (1) compounds which may be designated as polymeric silicomercaptols containing both silicon and sulfur and (2) compounds which may be called heterocyclic silicate esters which contain silicon and at least one of the group consisting of sulfur, selenium, sulfur and oxygen, sulfur and selenium, and selenium and oxygen. As far as is known, neither of these types of compounds have been known nor disclosed heretofore.

It is the primary object of this invention to produce a new class of organic silicon-containing reaction products. Another object is to provide a process for preparing these new reaction products. Other objects will appear hereinafter.

Considered in its broadest aspect, the invention involves the preparation of silicon-containing compounds by reacting together a compound of each of the following classes: (1) a halide of silicon containing at least two reactive halogen atoms directly attached to the silicon atom, and corresponding to the general formula:

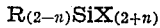

where R is a radical selected from the group consisting of alkyl, aryl, alkaryl, aralkyl, alkoxy, aryloxy and alicyclic radicals; X is a halogen atom; and $n$ is zero to 2; and (2) a compound of the type formula:

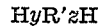

where R' is an organic radical selected from the group consisting of alkylene and arylene radicals; and $y$ and $z$ each represent a member of the group consisting of oxygen, sulfur and selenium, but $y$ and $z$ are not both oxygen.

In general, any silicon halide of the aforementioned type may be employed in the reaction providing that the other substituent (R) groups attached to the silicon atom do not sterically hinder the halogen atoms. As examples of suitable silicon halide reactants there may be mentioned such compounds as dimethylsilicondichloride, diethylsilicondichloride, diethoxysilicondichloride, diphenylsilicondichloride, dibenzylsilicondichloride and the like. As indicated by the foregoing general formula, the silicon halide may contain three, or even four, halogen atoms, however the preferred products are obtained when the silicon halide contains two halogen atoms.

With respect to the H$y$R'$z$H reactant, compounds such as 1,2 - ethanedithiol, 1,3 - propanedithiol, 1,4-butanedithiol, 1,6-hexanedithiol, 1,10-decanedithiol, 2-mercaptoethanol, 6-mercaptohexanol, 10-mercaptodecanol, 2-selenomercaptoethanol, 6-selenomercaptohexanol, 2-selenomercaptoethylmercaptan, mercaptophenol, dimercaptobenzene, and the like may be mentioned as being suitable for use in the invention.

In one embodiment of our invention the novel polymeric silicomercaptols are prepared by reacting the halide of silicon, for example, diethylsilicondichloride, with a polymercaptan, such as 1,4-butanedithiol. A third reactant, which acts as a chain terminator, is preferably employed in the reaction in order to control the size of the mercaptol polymer obtained. Trialkyl chlorosilanes, such as triethylchlorosilane and alkyl monomercaptans, such as octylmercaptan, are especially preferred for this purpose, although alcohols, phenols and secondary amines, of which n-pentanol, phenol and piperidine are specific examples, may be satisfactorily employed. Also, since a hydrohalogen acid is produced in the reaction, it is desirable that an acceptor for the hydrogen halide acid be added to increase the rate of reaction.

We have found, and it is considered to be part of this invention, that certain tertiary amines, such as triethyl amine, trimethyl amine, 2-methyl pyridine, N-ethyl piperidine, etc. are highly effective as hydrogen halide acceptors in the reaction of the invention. Primary and secondary amines, on the other hand, are not suitable since the hydrogen of the N group reacts with the halosilane reactant to form aminosilanes. The mechanism apparently involved in the effectiveness of the tertiary amines is the primary formation of a quaternary salt:

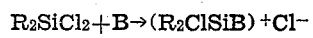

followed by:

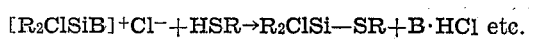

where B represents a tertiary amine. All tertiary amines, however, do not give satisfactory results. The fact that certain tertiary amines are not effective is, therefore, attributable to steric factors. However, we have also found that, in order to be effective, the tertiary amine should also have a basic dissociation constant (K$_B$) greater than that of alpha-picoline. Whether a tertiary amine is sterically hindered may be readily determined, as those which are not are able to form quaternary ammonium salts under favorable reaction conditions, while those which are so hindered will not do so. Optimum conditions for the formation of quaternary ammonium salts have been defined for numerous tertiary amines in an article by Westphal and Jerchel, Berichte' 73, 1002 (1940). These conditions involve the reaction of the tertiary amine with an alkyl halide, such as methyl iodide, in a polar solvent, such as ethanol, at a temperature of from 90° C. to 150° C. and for a time period of from about 6 to about 24 hours.

To illustrate the foregoing, dimethyl-aniline for example, is not sterically hindered, however it is ineffective in the reaction because it is a weaker base than alpha-picoline. On the other hand, triamylamine, although a much stronger base than alpha-picoline, is ineffective because it is sterically hindered as indicated by its failure to form quaternary salts under the conditions given hereinbefore. Triethylamine, however, is a strong base and nonsterically hindered. It is, therefore, a highly effective reagent for use in the reaction.

The reaction may be readily effected by mixing the two reactants at ordinary temperatures and pressures, preferably in an inert solvent medium, such as benzene, toluene, xylene, petroleum naphtha, etc., the hydrohalogen acceptor being added portionwise as the reaction proceeds. As heretofore indicated, a chain terminating material may be present in the reaction if desired. Although the reaction occurs readily at ordinary temperatures, it is facilitated by elevated temperatures up to about 200° C. Sufficient heating is conveniently obtained, however, by conducting the reaction at the reflux temperature of the solvent medium.

The proportions of reactants employed in the reaction are not critical and may, therefore, be varied considerably. However, the best results are obtained when substantially stoichiometric amounts of the reactants are used.

The reaction between the silicon halide and the H$y$R'$z$H compound in the presence of a chain terminator is illustrated by the following general equation, wherein the silicon halide reactant contains two halogen atoms and the H$y$R'$z$H reactant contains two mercaptan groups, thus:

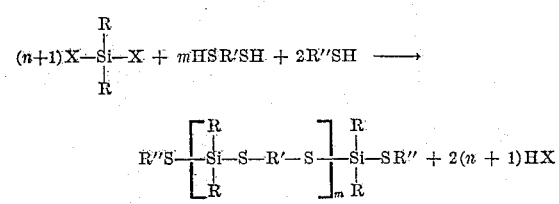

where X is a halogen, R is a member of the group consisting of alkyl, aryl, alkaryl, aralkyl, alkoxy, aryloxy and alicyclic radicals; R' is selected from the group consisting of alkylene and arylene radicals; R'' is alkyl; and $m$ is an integer equal to, or greater than, unity.

The products obtained when the silicon halide reactant contains more than two halogen atoms and/or the polymercaptan reactant contains more than two mercaptan groups are three dimensional cross-linked polymers, the structures of which are extremely complex, and therefore, not subject to portrayal.

As aforesaid, the invention also provides for the production of a novel class of heterocyclic compounds of the type formula:

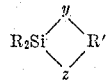

where R is selected from the group consisting of alkyl, aryl, alkaryl, aralkyl, alkoxy, aryloxy and alicyclic radicals; R' is an alkylene or arylene radical; and $y$ and $z$ are members of the group consisting of oxygen, sulfur and selenium, but both are not oxygen. This type of compound is obtained as a predominant portion of the reaction product when R' of the H$y$R'$z$H reactant is an alkylene group containing two or three carbon atoms as, for example, ethanedithiol. Thus, in such instance, the product obtained is a mixture of compounds comprised of the heterocyclic silicon esters and the polymeric silico mercaptols. The reaction which produces the heterocyclic compounds is illustrated by the following general equation:

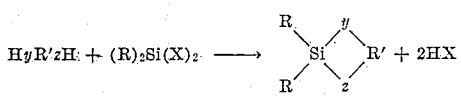

where R, R', $y$ and $z$ are as defined hereinbefore. The heterocyclic silicon product compounds may be readily separated from the polymeric silico mercaptols, which are simultaneously formed, by fractional distillation. This separation step is illustrated in the examples presented hereinafter, particularly Examples IV and VI.

The reaction to form heterocyclic compounds may also occur when the halosilicon reactant contains only one, or no alkyl groups, in which instance mixed polymeric and heterocyclic compounds are formed.

In order that a full understanding of the manner of preparation and of the nature of the new silicon compounds of our invention may be had, the following illustrative examples are given:

*Example I*

A mixture consisting of 15.7 grams of diethylsilicondichloride, 11.6 grams of 1,4-butanedithiol and 1.46 grams of n-octyl mercaptan was dissolved in 250 cc. of dry benzene and treated with 30 grams of anhydrous triethylamine. The immediate precipitation of triethylammonium chloride indicated that the desired reaction was taking place. After heating under reflux (80° C.) for one hour the triethylammonium chloride was removed by filtration and the filtrate was returned to the original reaction flask and heated for two additional hours. During this period, no significant amount of triethylammonium chloride was formed indicating that the desired condensation reaction was essentially complete. The benzene and other volatile components in the mixture were removed by distillation in vacuo and the residue was finally held at 350° C. under 20 mm. pressure for one-half hour. The product was an oil having a kinematic viscosity of 98.3 centistokes at 100° F. and 16.93 centistokes at 210° F. The average molecular weight of the polymeric silico mercaptol thus prepared was 838.

*Example II*

A mixture consisting of 64.5 grams of dimethyl silicon dichloride, 58 grams of 1,4-butanedithiol and 7.3 grams of octylmercaptan was dissolved in 300 cc. of dry benzene and treated with 72 grams of trimethylamine. The reaction and isolation of the product was carried out as described in Example I and the polymeric silico mercaptol consisted of a viscous oil having a kinematic viscosity of 119.4 centistokes at 100° F. and 16.69 centistokes at 210° F.

*Example III*

A mixture consisting of 64.5 grams of dimethylsilicon dichloride and 47.0 grams of 1,2-ethanedithiol was dissolved in 500 cc. of anhydrous benzene and treated with 123 grams of anhydrous triethylamine. After heating under reflux (80° C.) for six hours, the mixture was filtered and the benezene and other volatile components were removed by distillation in vacuo. The residue consisted of a viscous oil, average molecular weight 374.

*Example IV*

The portion of the product oil obtained in Example III was distilled. The main fraction distilled at 54° to 55° at 2 mm. There was thus obtained 44 grams of a colorless, mobile liquid, 2,2-dimethylsilico-1,3-dithiolane. The product exhibited the following physical properties:

|  | Calculated | Found |
| --- | --- | --- |
| $d_4^{20}$ |  | 1.1077 |
| $n_D^{20}$ |  | 1.55711 |
| $M_D$ | 44.75 | 43.65 |

*Example V*

To a mixture of 23.6 grams of diethoxydichlorosilane, 11.7 grams of 1,2-ethanedithiol and 120 cc. of benzene, there was added 30 grams of triethylamine. After the addition was complete, the mixture was heated under reflux (80° C.) for two hours. The solid was filtered off and the filtrate subjected to distillation in vacuo to remove the volatile constituents. The residue after distilling at 129°/19 mm. consisted of a yellow oil (13 grams).

*Example VI*

The portion of the product obtained in Example V which distilled at 129° at 19 mm. was a colorless liquid, diethoxysilico-1,3-dithiolane, as shown by the following analysis:

|  | Calculated for $C_6H_{14}O_2S_2Si$ | Found |
| --- | --- | --- |
| Per Cent S | 30.5 | 29.59 |
| Per Cent Si | 13.4 | 12.07 |

The product also exhibited the following physical properties:

|  | Calculated | Found |
| --- | --- | --- |
| $d_4^{20}$ |  | 1.1344 |
| $n_D^{20}$ |  | 1.49564 |
| $M_D$ | 55.53 | 55.92 |

*Example VII*

To a mixture of 25.3 grams of diphenyldichlorosilane, 10 grams of ethanedithiol and 200 cc. of benzene was added 30 grams of triethylamine. After heating under reflux (80° C.) for two hours, the solution was filtered and the filtrate heated to 240° C./2 mm. The residue consisted of a viscous polymeric oil.

*Example VIII*

Seventy-eight and five tenths grams of diethyl dichlorosilane, 44.6 grams of ethane-1,2-dithiol and 7.3 grams of n-octyl mercaptan in 500 cc. of benzene were placed in a flask and 123 grams of triethylamine added dropwise with good stirring. Whenever the mixture contained too much solid for efficient stirring, it was filtered, the filtrate returned to the flask and the addition of the amine continued. After refluxing for five hours (80° C.) the solution was chilled and filtered. The filtrate was then distilled. After the solvent had been removed, the main fraction, boiling up to 143° at 3 mm. was obtained. This was then fractionated. The desired fraction, 2,2-diethyl-silico-1,3-dithiolane, 51 grams, boiled at 78 to 80° at 5 mm. The product also exhibited the following physical properties:

|  | Calculated | Found |
| --- | --- | --- |
| $d_4^{20}$ |  | 1.0524 |
| $n_D^{20}$ |  | 1.53503 |
| $M_D$ | 54.01 | 53.15 |

*Example IX*

To 110 grams of triethylamine and 64.5 grams of dimethyl-dichlorosilane, there was added dropwise 39 grams of 2-mercaptoethanol in 50 cc. of benzene. The reaction was immediately evident by the precipitation of salt and evolution of heat. The material was stirred and heated (80° C.) for five hours, then cooled and filtered. After the solvent was removed, the residue was fractionated. The main fraction, 2,2-dimethyl-silico-1-oxa-3-thiolane, was a yellow mobile liquid boiling at 95° at 17 mm. The yield was 36 grams. Analysis of the product gave the following results:

|  | Calculated for $C_4H_{10}OSSi$ | Found |
| --- | --- | --- |
| Per Cent S | 23.8 | 23.4 |

The product also exhibited the following physical properties:

|  | Calculated | Found |
| --- | --- | --- |
| $d_4^{20}$ |  | 1.0742 |
| $n_D^{20}$ |  | 1.49274 |
| $M_D$ | 37.21 | 36.24 |

*Example X*

To a mixture of 15.9 grams of propane-1,3-thiol, 23.6 grams of diethyldichlorosilane and 250 cc. of benzene, there was added dropwise 45 grams of triethylamine. The mixture was stirred and heated (80° C.) for 2½ hours. The solution was then filtered and the residue distilled. The desired fraction boiled at 110 to 120° at 6 mm. Analysis of the product gave the following results:

|  | Calculated for $C_7H_{16}S_2Si$ | Found |
| --- | --- | --- |
| Per Cent S | 33.3 | 32.67 |
| Per Cent Si | 14.6 | 13.8 |

Under the reaction conditions of the foregoing examples, novel reaction products are obtained by reacting dichlorosilanes in which the organic (R) substituents are groups, such as phenoxy, benzyl and cycloalkyl radicals with $HyR'zH$ type compounds wherein the group R' is an arylene radical, such as phenylene.

The new organic silicon reaction products of the invention are stable to heat and oxidation. Since the physical properties of these materials may be readily varied, they are useful as synthetic lubricants in a variety of applications. Thus, they may be used alone for lubricating purposes or in mineral oil compositions. In the latter instance, they improve the thermal and oxidation stability of the lubricant. Furthermore, they are effective for preventing or minimizing foaming in mineral oil compositions.

Although certain preferred procedures for preparing the reaction products contemplated herein have been described and illustrative reaction products have been disclosed, the invention is not limited to these procedures or products, but includes within its scope such changes and modification as fairly come within the spirit of the appended claims.

We claim:

1. As a new composition of matter, the reaction product obtained by reacting: (1) a halide of silicon of the general formula $$R_{(2-n)}SiX_{(2+n)}$$

where R represents a radical selected from the group consisting of alkyl, aryl, aralkyl and alkoxy radicals, X is halogen and $n$ is 0 to 2, with (2) a compound of the general formula $HyR'zH$ where R' is an organic radical selected from the group consisting of alkylene and arylene radicals and $y$ and $z$ each represent a member of the group consisting of sulfur and selenium, in an inert solvent medium in the presence of a tertiary amine having a basic dissociation constant ($K_B$) value greater than that of alpha-picoline and which is free of steric hindrance.

2. As a new composition of matter, the reaction product obtained by reacting: (1) a halide of silicon of the general formula $$R_{(2-n)}SiX_{(2+n)}$$

where R is a radical selected from the group consisting of alkyl, aryl, aralkyl, and alkoxy radicals, X is halogen, and $n$ is 0 to 2, with (2) a compound of the general formula HSR'SH where R' is an organic radical selected from the group consisting of alkylene and arylene radicals, in an inert solvent medium in the presence of a tertiary amine having a basic dissociation constant ($K_B$) value greater than that of alpha-picoline and which is free of steric hindrance.

3. As a new composition of matter, the reaction product obtained by reacting a halide of silicon of the general formula $$R_{(2-n)}SiX_{(2+n)}$$

where R is a radical selected from the group consisting of alkyl, aryl, aralkyl, and alkoxy radicals, X is halogen, and $n$ is 0 to 2, with 1,4-butanedithiol, in an inert solvent medium in the presence of a tertiary amine having a basic dissociation constant ($K_B$) value greater than that of alpha-picoline and which is free of steric hindrance.

4. As a new composition of matter, the reaction product obtained by reacting: (1) a halide of silicon of the general formula $$R_{(2-n)}SiX_{(2+n)}$$

where R is a radical selected from the group consisting of alkyl, aryl, aralkyl and alkoxy radicals, X is halogen, and $n$ is 0 to 2, with (2) a compound of the general formula HSR'SH where R' is an alkylene radical containing from two to three carbon atoms; in an inert solvent medium in the presence of a tertiary amine having a basic dissociation constant ($K_B$) value greater than that of alpha-picoline and which is free of steric hindrance.

5. As a new composition of matter, the reaction product obtained by reaction of diethylsilicondichloride with 1,2 ethanediethiol, in an inert solvent medium in the presence of a tertiary amine having a basic dissociation constant ($K_B$) value greater than that of alpha-picoline and which is free of steric hindrance.

6. As a new composition of matter, the reaction product obtained by reaction of diethylsilicondichloride with 1,4-butanediethiol, in an inert solvent medium in the presence of a tertiary amine having a basic dissociation constant ($K_B$) value greater than that of alpha-picoline and which is free of steric hindrance.

7. As a new composition of matter, the reaction product obtained by reaction of diethylsilicondichloride with 1,2-ethanedithiol in an inert solvent medium in the presence of triethyl amine.

8. As a new composition of matter, the reaction product obtained by reaction of diethylsilicondichloride with 1,4-butanedithiol in an inert solvent in the presence of triethylamine.

9. The process which comprises reacting: (1) a halide of silicon of the general formula $$R_{(2-n)}SiX_{(2+n)}$$

where R is a radical selected from the group consisting of alkyl, aryl, aralkyl and alkoxy radicals, X is halogen, and $n$ is 0 to 2, with (2) a compound of the general formula $HyR'zH$ where R' is an organic radical selected from the group consisting of alkylene and arylene radicals, and $y$ and $z$ each represent a member of the group consisting of sulfur, and selenium, in an inert solvent medium in the presence of a tertiary amine having a basic dissociation constant ($K_B$) value greater than that of alpha-picoline and which is free of steric hindrance.

10. The process which comprises reacting: (1) a halide of silicon of the general formula $$R_{(2-n)}SiX_{(2+n)}$$

where R is a radical selected from the group consisting of alkyl, aryl, aralkyl and alkoxy radicals, X is halogen, and $n$ is 0 to 2, with (2) a compound of the general formula HSR'SH where R' represents an organic radical selected from the group consisting of alkylene and arylene radicals, in an inert solvent medium in the presence of a tertiary amine having a basic dissociation constant ($K_B$) value greater than that of alpha-picoline and which is free of steric hindrance.

11. A process which comprises reacting a halide of silicon of the general formula $$R_{(2-n)}SiX_{(2+n)}$$

where R is a radical selected from the group consisting of alkyl, aryl, aralkyl and alkoxy radicals, X is halogen, and $n$ is 0 to 2, with 1,4-butanedithiol, in an inert solvent medium in the presence of a tertiary amine having a basic dissociation constant ($K_B$) value greater than that of alpha-picoline and which is free of steric hindrance.

12. The process which comprises reacting (1) a halide of silicon of the general formula $$R_{(2-n)}SiX_{(2+n)}$$

where R is a radical selected from the group consisting of alkyl, aryl, aralkyl and alkoxy radicals, X is halogen, and $n$ is 0 to 2, with (2) a compound of the general formula HSR'SH where R' is an alkylene radical containing from two to three carbon atoms, in an inert solvent medium in the presence of a tertiary amine having a basic dissociation constant ($K_B$) value greater than that of alpha-picoline and which is free of steric hindrance.

13. The process which comprises reacting diethylsilicondichloride with 1,2-ethanedithiol in an inert solvent medium in the presence of a tertiary amine having a basic dissociation constant ($K_B$) value greater than that of alpha-picoline and which is free of steric hindrance.

14. The process which comprises reacting diethylsilicondichloride with 1,4-butanedithiol in the presence of a tertiary amine having a basic dissociation constant ($K_B$) value greater than that of alpha-picoline and which is free of steric hindrance.

15. The process which comprises reacting diethylsilicondichloride with 1,2-ethanedithiol in an inert solvent medium in the presence of triethylamine.

16. The process which comprises reacting diethylsilicondichloride with 1,4-butanedithiol in an inert solvent medium in the presence of triethylamine.

FREDERICK P. RICHTER.
BERNARD A. ORKIN.

REFERENCES CITED

The following references are of record in the file of this patent:

UNITED STATES PATENTS

| Number | Name | Date |
|---|---|---|
| 2,114,866 | Vaughn | Apr. 19, 1938 |
| 2,386,793 | Hanford | Oct. 16, 1945 |
| 2,465,339 | Schreiber | Mar. 29, 1949 |

OTHER REFERENCES

Backer, et al., "Recueil des Trav. Chem.," vol. 54 (1935), pages 38–46.

Backer, et al., "Recueil des Trav. Chem.," vol. 54 (1935), pages 607–617.